United States Patent
Goldmann et al.

(10) Patent No.: US 12,200,288 B2
(45) Date of Patent: Jan. 14, 2025

(54) DATA TRANSMISSION METHOD, DATA TRANSMISSION DEVICE, AND DATA TRANSMISSION SYSTEM

(71) Applicants: Continental Automotive Technologies GmbH, Hannover (DE); Continental Automotive Systems, Inc., Auburn Hills, MI (US)

(72) Inventors: Andreas Goldmann, Neunkirchen (DE); Heath D Zietz, Auburn Hills, MI (US)

(73) Assignee: Continental Automotive Technologies GmbH, Hannover (DE)

(*) Notice: Subject to any disclaimer, the term of this patent is extended or adjusted under 35 U.S.C. 154(b) by 0 days.

(21) Appl. No.: 18/449,037

(22) Filed: Aug. 14, 2023

(65) Prior Publication Data

US 2024/0056625 A1 Feb. 15, 2024

(30) Foreign Application Priority Data

Aug. 15, 2022 (EP) .................................... 22190338

(51) Int. Cl.
  *H04B 1/38* (2015.01)
  *H04N 21/414* (2011.01)
  *H04N 21/422* (2011.01)

(52) U.S. Cl.
  CPC . *H04N 21/42221* (2013.01); *H04N 21/41422* (2013.01)

(58) Field of Classification Search
  CPC ........ H04N 21/42221; H04N 21/41422; G06F 13/4009; G06F 15/17; G06F 13/4045
  USPC ............................................................ 375/219
  See application file for complete search history.

(56) References Cited

U.S. PATENT DOCUMENTS

| | | | |
|---|---|---|---|
| 7,580,522 B2* | 8/2009 | Kangas | H04N 21/4344 713/168 |
| 2002/0126697 A1* | 9/2002 | Jost | H04N 21/235 370/537 |
| 2007/0183452 A1* | 8/2007 | Hryszko | H04N 21/4344 375/E7.022 |
| 2008/0313259 A1 | 12/2008 | Correa | |
| 2013/0024721 A1 | 1/2013 | Kabulepa et al. | |
| 2019/0250610 A1 | 8/2019 | Luo | |
| 2021/0109881 A1 | 4/2021 | Moustafa et al. | |

OTHER PUBLICATIONS

European Search Report dated Dec. 22, 2022, for the counterpart European Patent Application No. EP22190338.8.

* cited by examiner

*Primary Examiner* — Helene E Tayong

(57) ABSTRACT

A data transmission method to transmit data contained in k independent data streams to k receivers with a data transmission device, wherein specific data stream identifiers are attached to the independent data streams and then multiplexed into I multiplexed data streams. The multiplexed data streams are then transmitted via I UARTs to k microcontrollers which demultiplex the multiplexed data streams and select one of the contained independent data streams via an allocation protocol. The allocation protocol is identical on all microcontrollers and utilizes the specific data stream identifiers to allocate the k independent data streams to exactly one of the k receivers. The microcontrollers then send their selected independent data stream to an allocated receiver.

6 Claims, 7 Drawing Sheets

DATA TRANSMISSION METHOD, DATA TRANSMISSION DEVICE, AND DATA TRANSMISSION SYSTEM

CROSS-REFERENCE TO RELATED APPLICATIONS

The present application claims the priority from the European Patent Application No. 22190338.8 filed on Aug. 15, 2022, the content of which is herein incorporated by reference.

BACKGROUND

1. Field

Embodiments of the present application relate to a data transmission method to transmit data contained in k independent data streams to k receivers, a data transmission device which is being formed to carry out the afore-mentioned data transmission method, and a corresponding data transmission system.

2. Description of Related Art

Vehicles like cars, planes, trains, or busses already provide a wide range of infotainment systems and services including audio streams, video streams, or gaming opportunities. With autonomous vehicles gaining market share, the usage of these services is likely to increase since the driving task is transferred from human control to the autonomous vehicles which provides the time for passengers to engage in other activities. Simultaneously, the content of these services become more personalized and diverse. Consequently, the amount of data to be provided increases.

On the other hand, the electrical components which build the necessary infrastructure to provide such a multitude of independent data streams to a multitude of designated receivers, corresponding production methods, as well as software requirements are often subject to limitations due to cost efficiency, space constraints, or the like. These limitations pose serious challenges to meet the requirements for a specific product.

One of these limitations is the number of available data transmission channels, such as Universal Asynchronous Receiver Transmitters, which transmit a multitude of independent data streams between a multitude of senders and a multitude of receivers.

Components that would allow the sending of the required number of independent data streams out-of-the-box, for example by providing the same number of UARTs as independent data streams, are more expensive than components with fewer UARTs or such components might not even be available on the market at all.

Due to aforementioned hardware limitations in real applications, the number of data transmission channels is often smaller than the number of receivers and/or independent data streams. This would usually prohibit simultaneous transmission of the independent data streams to the receivers. In these cases, data processing methods can be deployed which combine a multitude of independent data streams into a single multiplexed data stream, transmitting the single multiplexed data stream via an available data transmission channel, and decompose the single multiplexed data stream into the original independent data streams.

However, sending the independent data streams to their designated receivers requires the selection of the correct independent data stream from the number of demultiplexed data streams. This selection might be performed in dedicated microcontrollers which are usually programmed individually to match a microcontroller to a receiver. In other words, each microcontroller executes a slightly different software code to select the correct independent data stream.

It would therefore be convenient to have access to an improved data transmission method which allows to send any number of independent data streams to the same number of receivers in such limiting environments.

SUMMARY

According to an aspect and object of an embodiment, there is provided an improved data transmission method to send any number of independent data streams to the same number of receivers in limiting environments.

A data transmission method to transmit data contained in k independent data streams to k receivers, whereas each of the k independent data streams is to be allocated to exactly one of the k receivers, comprises the following steps:

Providing a data transmission device with a number of I<k UARTs and with k microcontrollers, the data transmission device being designed to transmit the k independent data streams via the I UARTs and the k microcontrollers to the k receivers, whereas each of the k microcontrollers is allocated to exactly one of the k receivers;

Multiplexing of the k independent data streams into I multiplexed data streams, whereas a specific data stream identifier is allocated to each of the k independent data streams, whereas to generate out of the k independent data streams each I-th of the I multiplexed data streams, each I-th of the multiplexed data streams comprises at least two of the k independent data streams with their respective specific data stream identifiers;

Transmitting the I multiplexed data streams to exactly one of the I UARTs,

Transmitting the I multiplexed data streams from the I UARTs to the k microcontrollers, whereas each of the k microcontrollers is assigned to exactly one of the I UARTs, whereas each of the I UARTs is transmitting its I-th multiplexed data stream to at least two of the k microcontrollers;

Demultiplexing, within each of the k microcontrollers, the received multiplexed data stream, into the at least two independent data streams based on their specific data stream identifiers;

Selecting, within each of the k microcontrollers, one of the demultiplexed independent data streams via exactly one allocation protocol which allocates the k independent data streams to exactly one of the k receivers;

Sending the selected of the k independent data streams to the allocated of the k receivers.

According to this data transmission method, it is possible to send any number of independent data streams through a smaller number of UARTs to their designated receivers. It is also possible that the microcontrollers, which demultiplex the multiplexed data streams, are programmed identically via the same allocation protocol. This is possible because specific data stream identifiers were added to each independent data stream so that the allocation protocol can make use of this information to select the dedicated independent data stream for each microcontroller.

First, a multitude of k independent data streams is received by the data transmission device, while each of the k independent data streams is to be transmitted to exactly one of the k receivers. These independent data streams might be video files to be transmitted to and then displayed by cabin monitors in cars, airplanes, trains, busses, or the like. They might also be audio files to be transmitted to and then played by internal speakers built into a vehicle or external speakers such as wearable headphones.

Further possible types for the independent data streams may include document files, text files, navigation data, cloud service files, data from internet services, or the like.

Alternative types of receivers include wired or wireless headphones, cell phones, smart phones, displays, or any other device that can process at least one of the aforementioned types of independent data streams.

The communication link between the transmission device and the receivers might utilize, for example, short-wave, high frequency, ultra-high frequency, microwave, wireless fidelity, Bluetooth technology, Bluetooth Low Energy technology, or any other wireless communication technology. It is also possible that the communication link utilizes copper cables, fiber cables, coaxial cables, or any other type of wire communication technology.

The independent data streams might be made available by streaming services such as Netflix, Amazon Prime, Apple TV+, Apple Music, Hulu, Disney+, Sky Ticket, or the like. The independent data streams might even be made available by external devices such as smartphones, CDs, USB flash drive, or the like. They might also originate from internal sources such as sensors including Lidar, Radar, cameras, or the like.

Advantageously, the data transmission device is part of a vehicle, in particular a car.

Parts of the data transmission device can be incorporated into other devices such as cockpit high performance computers, body HPCs, infotainment systems, or head-units.

The data transmission device is able to receive the k independent data streams. It comprises I UARTs and k microcontrollers, wherein I<k. The I UARTs and the k microcontrollers do not have to be part of the same physical device but can rather be part of different physical devices. For example, the k microcontrollers can be distributed to k displays positioned anywhere in a car, wherein each display contains one microcontroller, while the I UARTs are part of the car's infotainment system built into the dashboard. The function of the UARTs is to make it possible to connect the data transmission device via cable directly or indirectly to the microcontrollers.

Each microcontroller is assigned to exactly one receiver. This assignment can be a direct physical link from the microcontroller to the receiver. There might also be an intermediate device which receives an independent data stream from the microcontroller and transmits it to the receiver. The assignment might also utilize wireless technology such as Bluetooth to link the microcontroller to a receiver. Therefore, the assignment of the microcontrollers to the receivers might require an action from a user who couples a receiver to a specific microcontroller. In this case, the assignment would be implemented by means of software.

After the k independent data streams have been received by the data transmission device, it assigns a specific data stream identifier to each of the independent data streams.

In one embodiment, the specific data stream identifier is provided as an index. An index is an integer attached at a specified position to the independent data stream. The index might be attached to the front of the independent data stream but it can also be attached elsewhere.

It is possible that for the purpose of assigning a specific data stream identifier to each of the independent data streams, the data transmission device comprises a dedicated data processing unit and appropriate software implementations. However, since the data transmission device might be part of another device such as an infotainment system that might already comprise a data processing unit, it is possible that for this purpose, existing resources can be used.

The data transmission device then combines the k independent data streams and their respective specific data stream identifiers into I multiplexed data streams. Each multiplexed data stream consists of at least two of the k independent data streams. None of the k independent data streams will be used in different multiplexed data streams.

The number of multiplexed data streams is smaller than the number of independent data streams and is identical to the number of available UARTs. The multiplexed data streams might be made available as virtual UARTs in a hypervisor, multivisor, or an operating system kernel.

Next, the multiplexed data streams are transmitted to the UARTs. Every UART will receive exactly one of the multiplexed data streams. In other words, no multiplexed data stream will be transmitted to more than one UART.

The I multiplexed data streams are now being transmitted to the k microcontrollers. This might be achieved directly or indirectly. A direct approach might involve a wired connection from the UART to the microcontroller. An indirect approach might involve an interposed device such as a serializer or a further microcontroller. However, at least one of the interposed devices must have a wired connection to the UART. It is worth noting that in cases where I>1, some but not all microcontrollers receive the same multiplexed data stream. The number of microcontrollers to which an UART is transmitting a multiplexed data stream is determined by the number of independent data streams that are multiplexed into that multiplexed data stream. As a consequence, each multiplexed data stream will be transmitted to at least two microcontrollers.

After the I multiplexed data streams have been transmitted to the k microcontrollers, they will be demultiplexed, i.e., they will be separated into the at least two independent data streams and their respective specific data stream identifiers that have been used to build the received multiplexed data stream.

Each microcontroller is programmed with an allocation protocol which can select one of the independent data streams that are available after demultiplexing the received multiplexed data stream. The allocation protocol utilizes at least the specific data stream identifiers which are also available after demultiplexing. As an example, the allocation protocol could simply be a table in which each specific data stream identifier is mapped to exactly one receiver. In this approach it is necessary that the specific data stream identifiers are unique. In other words, it is not possible to use identical indices for multiple independent data streams even if they will be part of different multiplexed data streams.

However, the allocation protocol can also be based on additional information as will be discussed in advantageous embodiments below.

After the independent data streams have been selected in the microcontrollers via the allocation protocol for the respective designated receiver, the selected independent data streams are sent to the receivers.

It is possible that the receivers and/or the microcontrollers are formed to request a certain independent data stream. For example, the microcontrollers might be built into display modules with touch capabilities to enable a user to control which video should be played on the display. The microcontroller then requests the independent data stream corresponding to the selected video from the source of the independent data streams. In this example, the source of the video files might be an internet video streaming service such as Amazon Prime. The correct allocation of the independent data streams to the receivers can then be assured by software and/or hardware implementations. This example can easily be transferred to any other aforementioned type of independent data streams and their respective sources.

The above-described data transmission method allows the usage of an infinite number of independent data streams and simultaneously a very small number of UARTs. In contrast, existing methods require either the same number of UARTs and independent data streams or an unfavorable individual programming of the microcontrollers.

In an advantageous embodiment of the data transmission method, the data transmission device is provided with k mediation devices, each containing one of the k microcontrollers and one of k deserializers. Each of the k deserializers is characterized by a specific label. Each deserializer is designated to one microcontroller, whereas each of the k deserializers receives one of the I multiplexed data streams. The deserializers transmit the received multiplexed data streams to their designated microcontroller, whereas the allocation protocol allocates a unique combination of the specific labels of the k deserializers and the specific data stream identifiers of the demultiplexed k independent data streams to the k receivers.

In other words, this advantageous embodiment provides a data transmission device which consists of multiple separate devices. Each of the k deserializers is connected via a cable directly or indirectly to exactly one of the I UARTs. Each deserializer is formed to receive the multiplexed data stream from the UART it is connected to. Further, each deserializer is connected via cable to the microcontroller within the same mediation device.

The specific label of the deserializers might be a serial number, a part number, or the like.

After a deserializer received a multiplexed data stream, the multiplexed data stream is transmitted to the allocated microcontroller.

The mediation device may contain additional components. Exemplary additional components might include, but are not restricted to, senders, touch panels, or TFT display panels. One example for a mediation device is a display module with a touch display and a Bluetooth module.

Within the microcontrollers, the received multiplexed data stream is first demultiplexed into the contained independent data streams and their specific data stream identifiers. The allocation protocol is formed to allow the selection of one of these independent data streams based on a unique combination of the specific label of the deserializer and the specific data stream identifier. For example, the allocation protocol could be implemented as a look-up-table in which each combination of the label of the deserializer and specific data stream identifier identifies a unique receiver.

In another advantageous embodiment of the data transmission method, the k mediation devices are arranged into I daisy chains. Each daisy chain comprises at least two of the k mediation devices wired in a sequence, whereas the first mediation device of each of the I daisy chains is physically connected to exactly one of the I UARTs. The I-th multiplexed data stream is transmitted from the I-th UART to the first mediation device of the I-th daisy chain. The first mediation device in the I-th daisy chain transmits the I-th multiplexed data stream to the succeeding mediation device in the sequence of the I-th daisy chain.

In general, a daisy chain is composed by multiple hardware components wired in sequence. In the scope of this embodiment, each daisy chain comprises at least two mediation devices wired in sequence. The first mediation device within each daisy chain sequence is physically connected to exactly one of the I UARTs, allocating each of the I UARTs to exactly one of the I daisy chains. The physical connection might be made via any wire communication technology like cables, fibers, or the like.

For example, let there be k=5 independent data streams to be allocated to five receivers, and I=2 UARTs available. Then, there are two daisy chains to be arranged from the five mediation devices. One daisy chain might be formed using two mediation devices, the other might be formed using three mediation devices. In this case, two of the five independent data streams will be multiplexed and transmitted to that UART that is connected to the daisy chain that is formed by two mediation devices. Similarly, the remaining three of the five independent data streams will be multiplexed and transmitted to the other UART that is connected to the daisy chain that is formed by the remaining three mediation devices.

The I multiplexed data streams are being transmitted from the I UARTs to the respective deserializer of the first mediation devices of the I daisy chains. Each first mediation device transmits the multiplexed data stream to the succeeding mediation device in the respective daisy chain as well as to their respective microcontrollers. Within the microcontrollers, the received multiplexed data stream is first demultiplexed into the contained independent data streams and their specific data stream identifiers. The allocation protocol is formed to allow the selection of one of these independent data streams based on a unique combination of the specific label of the deserializer and the specific data stream identifier. It is therefore possible to use identical specific data stream identifiers for multiple independent data streams given that they will become parts of different multiplexed data streams.

In one embodiment, each mediation device within each of the I daisy chains transmits the received multiplexed data stream to the succeeding mediation device in the sequence of that I-th daisy chain. In addition, each received multiplexed data stream is also transmitted to the microcontrollers allocated to the deserializers of the mediation devices. Within the microcontrollers, the received multiplexed data stream is first demultiplexed into the contained independent data streams and their specific data stream identifiers. The allocation protocol is formed to allow the selection of one of these independent data streams based on a unique combination of the specific label of the deserializer and the specific data stream identifier.

A data transmission device is particularly formed to carry out the above-described data transmission method. The data transmission device is formed to transmit data contained in k independent data streams to k receivers, whereas each of the k independent data streams is to be allocated to exactly one of the k receivers. The data transmission device comprises k microcontrollers, each being assigned to exactly one of the k receivers. Further, the data transmission device comprises I<k UARTs, the I UARTs being formed to transmit multiplexed data streams to the k microcontrollers. Moreover, the data transmission device comprises a multiplexer to multiplex the k independent data streams into I multiplexed data streams, whereas a specific data stream identifier is allocated to each of the k independent data streams, the multiplexer being formed to multiplex at least two of the k independent data streams with their respective specific data stream identifiers, the multiplexer further being formed to transmit the I multiplexed data streams to exactly one of the I UARTs. Each of the k microcontrollers is assigned to exactly one of the I UARTs, each of the I UARTs being formed to transmit its I-th multiplexed data stream to at least two of the k microcontrollers, whereas each of the k microcontrollers is formed to demultiplex the received I-th multiplexed data stream into the at least two independent data streams based on their specific data stream identifiers. Further, the data transmission device comprises an allocation protocol which allocates the k independent data streams to exactly one of the k receivers, the k microcontrollers being further formed to select one of the demultiplexed independent data streams via the allocation protocol. Further, the data transmission device comprises k senders to send the selected of the k independent data streams to the allocated of the k receivers.

The data transmission device comprises k microcontrollers and I<k UARTs, which are not necessarily part of a single physical device. For example, the UARTs can be part of an infotainment system while each of the microcontrollers is built into one of k physically separated devices such as display modules. In other words, although each microcontroller is allocated to exactly one UART, each UART is allocated to at least two microcontrollers. This allocation might be realized by physical connections such as cables or any other wire communication technology.

The data transmission device further comprises k senders, whereas each of the k senders is allocated to exactly one of the k microcontrollers and to exactly one of the k receivers. In other words, each of the k microcontrollers is indirectly allocated to exactly one of k receivers. Each sender can transmit the independent data stream received from its allocated microcontroller to its allocated receiver. Possible examples for senders include wire communication technology such as cables as well as wireless communication technology such as a Bluetooth module.

After the k independent data streams have been received by the data transmission device, they are multiplexed within the multiplexer in such a way, that a specific data stream identifier is allocated to each independent data stream. Further, the multiplexer will always multiplex at least two of the k independent data streams and their specific data stream identifier into a multiplexed data stream. The multiplexer is formed to create I multiplexed data streams. After the I multiplexed data streams are created, each of the I multiplexed data streams is transmitted to exactly one of the I UARTs. This transmission might be done via cable or any other wire communication technology.

Next, each of the I multiplexed data streams is transmitted from the UARTs directly or indirectly to the k microcontrollers. Each UART transmits its multiplexed data stream directly or indirectly to at least two microcontrollers.

Once a multiplexed data stream is received by a microcontroller, it is demultiplexed into the contained at least two independent data streams and their respective specific data stream identifiers.

The data transmission device comprises an allocation protocol which is used within the microcontrollers to select one of the independent data streams after the demultiplexing. The allocation protocol assigns each independent data stream to exactly one microcontroller at least partly based on the specific data stream identifier. Since each receiver is allocated to exactly one microcontroller, the allocation protocol indirectly assigns each independent data stream to exactly one receiver.

Finally, the selected independent data stream is transmitted from the microcontrollers to the senders and from there to the receivers.

In an advantageous embodiment, the independent data streams are one of or a combination of the following: audio file, video file, document file, text file, navigation data, or data provided from internet-services.

In a further example, the I UARTs are part of a Low Voltage Differential Signaling serializer, whereas in particular the LVDS serializer comprises a maximum of two UARTs.

The serializer might be integrated into equipment that is already available in the application area. For example, if the data transmission device is used in a vehicle, it might be part of a head unit, an infotainment system, or the like.

Advantageously, the multiplexer is formed to attach an index to an independent data stream as a specific data stream identifier.

In another embodiment, the microcontrollers, deserializers, and senders are contained in k mediation devices. Each mediation device contains one microcontroller, one deserializer, and one sender. Each deserializer comprises a specific label which might be a serial number, a part number, or the like. The deserializers are formed to receive one of the I multiplexed data streams. Further, each deserializer can transmit its received multiplexed data stream to the microcontroller within the same mediation device.

The microcontrollers demultiplex the received multiplexed data stream into the contained independent data streams and their respective specific data stream identifiers. The microcontrollers are programmed with an allocation protocol that uses a unique combination of the specific labels of the deserializers and the specific data stream identifiers of the independent data streams to allocate the microcontrollers to the receivers.

In a further advantageous embodiment, the k mediation devices are arranged into I daisy chains. Each daisy chain contains at least two mediation devices wired in a sequence, whereas the first mediation device of each of the I daisy chains is physically connected to exactly one of the I UARTs via its deserializer and can therefore receive the multiplexed data stream from that connected UART. Further, the first mediation device can transmit its received multiplexed data stream to the succeeding mediation device in the sequence.

In one implementation, each mediation device within the sequence of each of the I daisy chains is formed to transmit its received I-th multiplexed data stream to the succeeding mediation device in the sequence of the I-th daisy chain.

It is understood that all advantages and features of the afore-described method also apply for the device embodiments.

A data transmission system comprises a vehicle and a data transmission device as described above, wherein the I UARTs, the k microcontrollers, the allocation protocol, the multiplexer, the k mediation devices, the LVDS serializer, the k deserializers, and the senders are provided in the vehicle.

Therefore, the receivers might or might not be part of the vehicle. One example for receivers that are part of the vehicle are build-in speakers. One example for receivers that are not part of the vehicle are Bluetooth headphones.

Illustrative embodiments of the present disclosure provide a data transmission method, a data transmission device, and a data transmission system. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments.

BRIEF DESCRIPTION OF THE DRAWINGS

Embodiments are described in the following with reference to the accompanying drawings, wherein:

FIG. 4 shows a schematic view of the data transmission device according to FIG. 3 limited to the use of two UARTs as part of a Low Voltage Differential Signal serializer, wherein the multitude of independent data streams have been splitted into two groups according to which of the UARTs they will be transmitted to;

DETAILED DESCRIPTION

Figure 1:
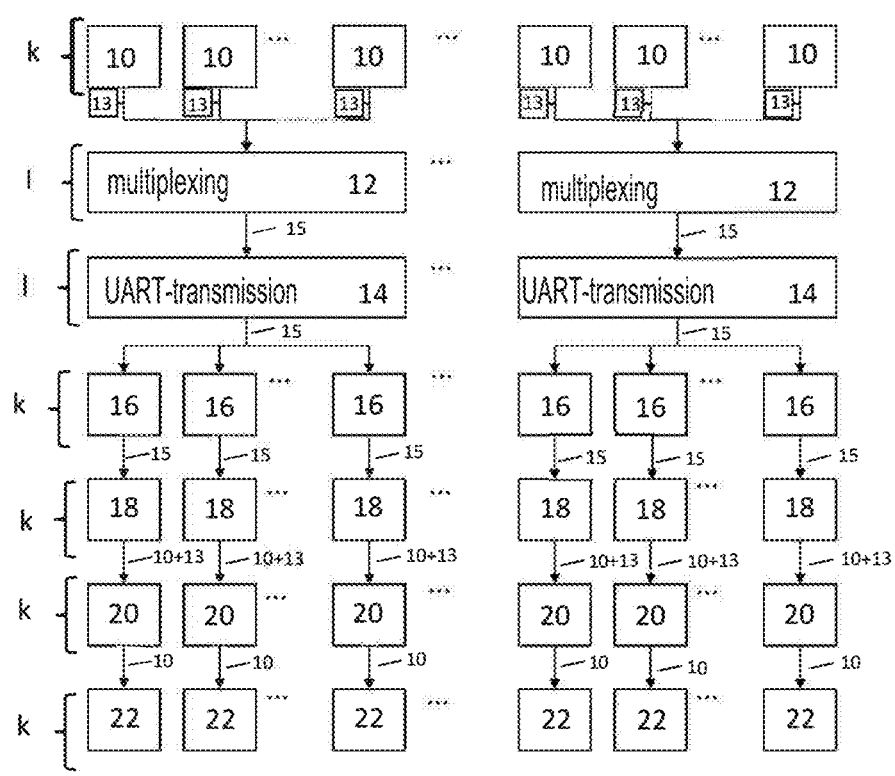
FIG. 1 shows a schematic flow chart of a data transmission method to transmit data contained in a multitude of independent data streams.

FIG. 1 shows a schematic flow chart with steps of a data transmission method to transmit data contained in a multitude k of independent data streams 10. Although only k=6 independent data streams 10 are depicted explicitly, the general multitude k is symbolized by horizontal dots. In the subsequent description and figures, any general multitude will be referred to and symbolized by horizontal dots. It is noted that the content of the independent data streams 10 and therefore the independent data streams 10 themselves are in general not identical.

In the example of FIG. 1, the independent data streams 10 are made available to a data transmission device 32. The data transmission device 32 is formed to receive the independent data streams 10, for example by being able to download data from a video streaming service via the internet. Other means to receive the data are possible, including an external source of the independent data streams 10 including but not limited to smartphones.

In a first step, multiplexing step 12, the multitude k of independent data streams 10 are multiplexed into a multitude of I multiplexed data streams 15. During the multiplexing step 12, a specific data stream identifier 13 is allocated to each independent data stream 10. This specific data stream identifier 13 might be a unique index attached to an independent data stream 10. Each multiplexed data stream 15 contains only a subset of the available independent data streams 10. However, each multiplexed data stream 15 contains at least two independent data streams 10. For the purpose of the multiplexing, the data transmission device 32 may contain a dedicated multiplexer 34.

In a next step, UART-transmission step 14, the multiplexed data streams 15 are then transmitted to a multitude of I UARTs 36. Each UART 36 receives only a single multiplexed data stream 15.

In a subsequent step, UART-to-microcontroller-transmission step 16, the I multiplexed data streams 15 are transmitted to a multitude of k microcontrollers 38. Each microcontroller 38 receives only a single multiplexed data stream 15.

Within each microcontroller 38, the received multiplexed data stream 15 is demultiplexed in a demultiplexing step 18 into the at least two independent data streams 10 and their respective data stream identifiers 13 contained in the received multiplexed data stream 15.

In a next step, selection step 20, carried out within each microcontroller 38, one of the independent data streams 10 that are available after the demultiplexing step 18 is selected based on the specific data stream identifiers 13 via an allocation protocol 40. To avoid the need to individually program each microcontroller 38 with a different allocation protocol 40, the allocation protocol 40 may utilize additional available information, as described in greater detail with reference to FIG. 5.

In a last step, sending step 22, the independent data streams 10 that have been selected in the selection step 20, are each sent to a receiver 44.

Figure 2:
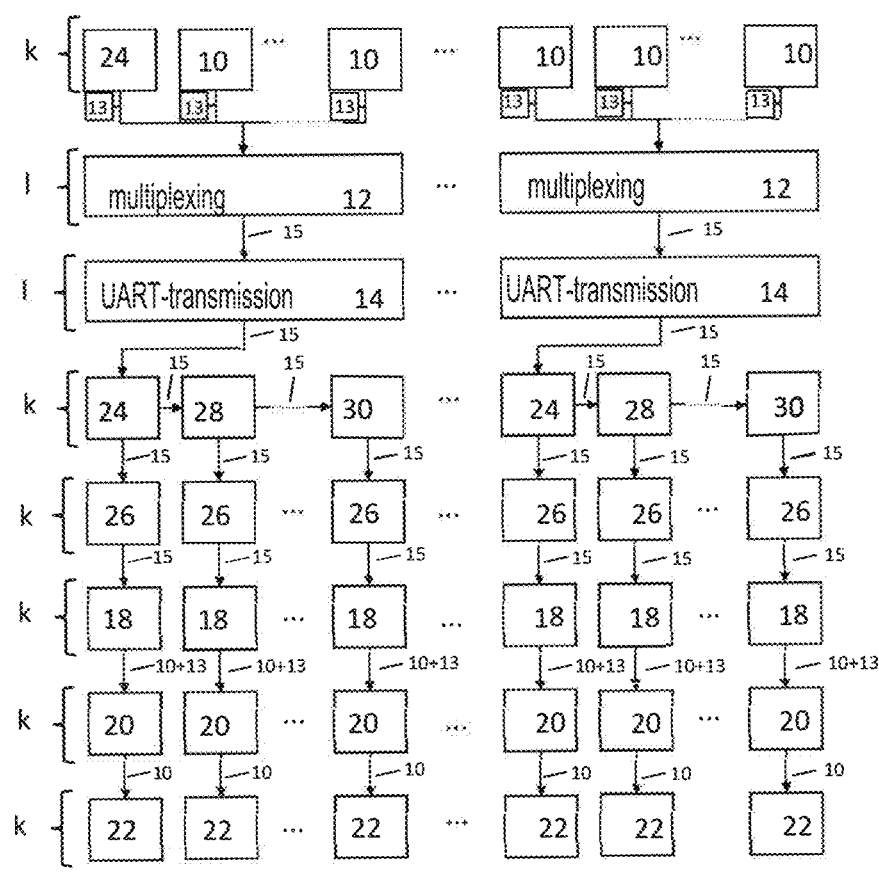
FIG. 2 shows a schematic flow chart of the data transmission method according to FIG. 1, whereas the data contained in the multitude of independent data streams are transmitted via mediation devices.

FIG. 2 shows a schematic flow chart of the data transmission method according to FIG. 1, whereas the data contained in the multitude of independent data streams 10 are transmitted via mediation devices 48.

The number k of mediation devices 48 is equal to the number of the independent data streams 10. Each mediation device 48 comprises a first deserializer 50i, a succeeding deserializer 50ii, or a final deserializer 50iii as well as a microcontroller 38. The mediation devices 48 are arranged into daisy chains 49, e.g. the mediation devices 48 are wired in sequence 51 with a first mediation device 68 wired to one of the I UARTs 36.

In the flowchart of FIG. 2, steps 12 and 14 correspond to steps 12 and 14 described with reference to FIG. 1. That is, the k independent data streams 10 are being multiplexed into I multiplexed data streams 15 in a multiplexing step 12 and then transmitted to the I UARTs 36 in a UART transmission step 14.

As a next step, UART-to-deserializer-transmission step 24, each of the I multiplexed data streams 15 is transmitted from the respective UART 36 to exactly one first deserializer 50i. Each first deserializer 50i receives only one of the I multiplexed data streams 15.

Next, the I multiplexed data streams 15 are transmitted from the first deserializer 50i of the first mediation device 68 in each daisy chain 49 to the succeeding deserializer 50ii of the succeeding mediation device 48 in the respective daisy chain 49 in a first-deserializer-to-second-deserializer-transmission step 28. Each succeeding deserializer 50ii receives only one of the I multiplexed data streams 15.

Then, each multiplexed data stream 15 is iteratively passed from one succeeding deserializer 50ii of a mediation device 48 to the succeeding deserializer 50ii of the succeeding mediation device 48 in a deserializer-to-succeeding-deserializer-transmission step 30, until the final deserializer 50iii of the final mediation device 48 in a daisy chain 49 is reached. Each final deserializer 50*iii* receives only one of the I multiplexed data streams 15.

Each first deserializer 50*i*, succeeding deserializer 50*ii*, and final deserializer 50*iii* will then transmit its received multiplexed data stream 15 to the microcontroller 38 it is connected to, in a deserializer-to-microcontroller step 26. Next, each microcontroller 38 will carry out the demultiplexing step 18, the selection step 20, and the sending step 22 as shown in FIG. 1.

Figure 3:
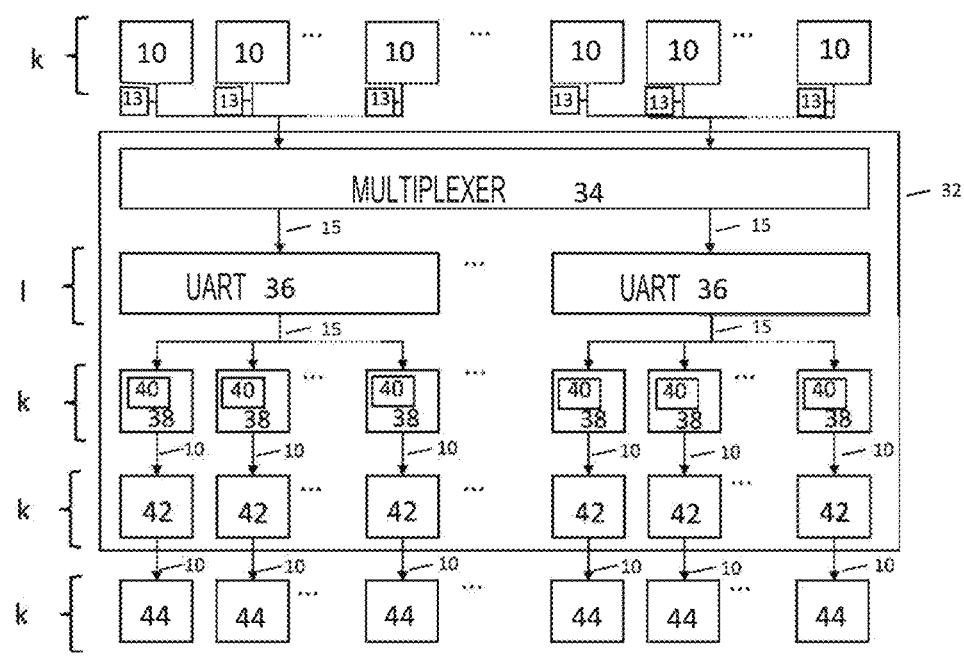
FIG. 3 shows a schematic view of a general embodiment of a data transmission device to transmit data contained in a multitude of independent data streams according to the data transmission method shown in FIG. 1.

FIG. 3 shows a schematic view of a general embodiment of a data transmission device 32 to transmit data contained in a multitude of independent data streams 10 according to the data transmission method shown in FIG. 1.

The data transmission device 32 comprises a multiplexer 34, a multitude of I<k UARTs 36, k microcontrollers 38, and k senders 42. Further, each microcontroller contains an allocation protocol 40.

It is noted that although each microcontroller 38 is depicted with the same reference number, these are different microcontrollers 38 so that in total, k microcontrollers 38 are present. The same is true for the senders 44 and similarly applies also for the UARTs 36. In contrast, the allocation protocols 40, from which exactly one is available on each microcontroller 38, are identical copies.

Figure 4:
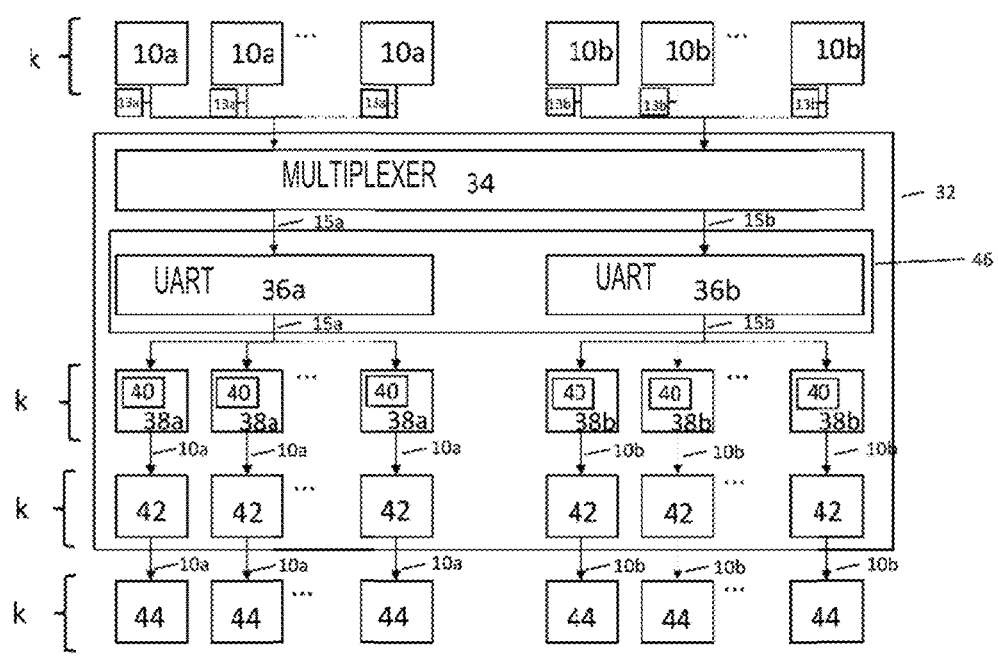

FIG. 4 shows a schematic view of the data transmission device 32 according to FIG. 3 limited to the use of two UARTs 36*a*, 36*b* as part of a Low Voltage Differential Signal serializer 46, wherein the multitude of independent data streams 10 have been splitted into two groups 10*a*, 10*b* according to which of the UARTs 36*a*, 36*b* they will be transmitted to.

In FIG. 4, multiple independent data streams 10*a*, 10*b* are transmitted to multiple receivers 44 using a LVDS serializer 46 with only two available UARTs 36*a*, 36*b*. Although the LVDS serializer 46 in this example only contains the two UARTs 36*a*, 36*b*, it is possible that the LVDS serializer 46 also contains other components that are typically part of LVDS serializers 46, but not shown here.

For the purpose of multiplexing the k independent data streams 10 into two multiplexed data streams 15*a*, 15*b*, a multiplexer 34 is part of the data transmission device 32. After the k independent data streams 10*a*, 10*b* and their specific data stream identifiers 13*a*, 13*b* have been multiplexed into two multiplexed data streams 15*a*, 15*b*, these are transmitted to the two UARTs 36*a*, 36*b*. Independent data streams 10*a* and their data stream identifiers 13*a* are combined into the multiplexed data stream 15*a* that is transmitted to the UART 36*a*. Similarly, independent data streams 10*b* and their data stream identifiers 13*b* are combined into the multiplexed data stream 15*b* that is transmitted to the UART 36*b*.

The multiplexed data stream 15*a* is transmitted to k microcontrollers 38*a*. Each microcontroller 38*a* will demultiplex the received multiplexed data stream 15*a*. The multiplexed data stream 15*b* is transmitted to k microcontrollers 38*b*. Each microcontroller 38*b* will demultiplex the received multiplexed data stream 15*b*.

With the help of an allocation protocol 40, each microcontroller 38*a*, 38*b* will select one independent data stream 10*a*, 10*b* from the received multiplexed data stream 15*a*, 15*b* and transmit it to its allocated sender 42. Lastly, the senders 42 will transmit the received independent data stream 10 to their allocated receiver 44.

Figure 5:
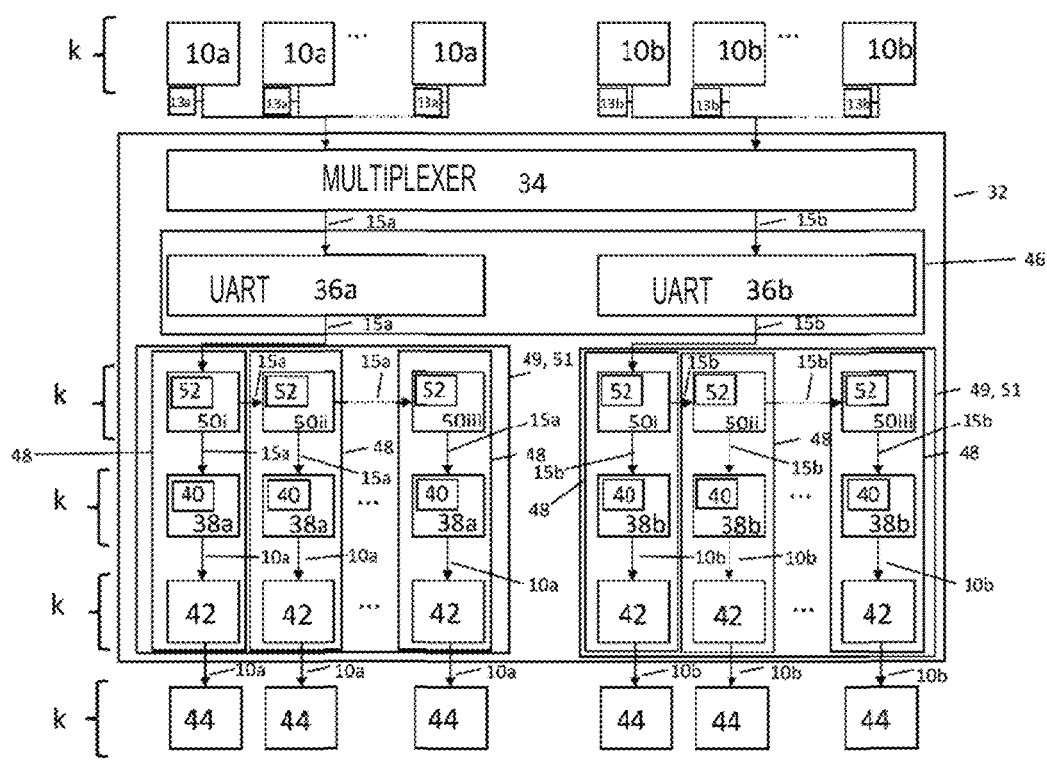
FIG. 5 shows a schematic view of the data transmission device according to FIG. 4, wherein the multitude of independent data streams are transmitted using two UARTs and k mediation devices.

FIG. 5 shows a schematic view of the data transmission device 32 according to FIG. 4, wherein the multitude of independent data streams 10*a*, 10*b* are transmitted using two UARTs 36*a*, 36*b* and k mediation devices 48.

After the two multiplexed data streams 15*a*, 15*b* are received by the UARTs 36*a*, 36*b* according to FIG. 4, the two multiplexed data streams 15*a*, 15*b* are transmitted to the first deserializer 50*i* of a first mediation device 48 in a daisy chain 49 as depicted by the arrows emanating from the UARTs 36*a*, 36*b*. Each daisy chain 49 comprises at least two of the k mediation devices 48 wired in a sequence 51. Each first deserializer 50*i* is characterized by a specific label 52.

Once a multiplexed data stream 15*a*, 15*b* is received by a first deserializer 50*i*, it is transmitted to the succeeding deserializer 50*ii* of the succeeding mediation device 48 in the daisy chain. Each succeeding deserializer 50*ii* is characterized by a specific label 52.

Each succeeding deserializer 50*ii* transmits its received multiplexed data stream 15*a*, 15*b* to further succeeding deserializers 50*ii* as indicated by the dotted arrow emanating from the succeeding deserializers 50*ii*. In this way, each of the multiplexed data streams 15*a*, 15*b* is iteratively passed from the first deserializer 50*i* of the first mediation device 48 via succeeding deserializers 50*ii* of succeeding mediation devices 48 until the final deserializer 50*iii* of the final mediation device 48 is reached. Each final deserializer 50*iii* is characterized by a specific label 52.

Then, each microcontroller 38 will demultiplex the received multiplexed data stream 15*a*, 15*b* into the contained independent data streams 10*a*, 10*b* and their specific data stream identifiers 13*a*, 13*b*. Each microcontroller 38 contains an allocation protocol 40, which will select one of the contained independent data streams 10 based on the specific label 52 of the first 50*i*, succeeding 50*ii*, or final deserializer 50*iii* allocated to it and the specific data stream identifiers 13*a*, 13*b*.

In other words, the allocation protocol 40 uses two information, the specific labels 52 of either the first deserializer 50*i*, the succeeding deserializer 50*ii*, or the final deserializer 50*iii*, and the specific data stream identifiers 13*a*, 13*b* to accurately select an independent data stream 10*a*, 10*b*.

The selected independent data streams 10*a*, 10*b* are then transmitted to the senders 42 and from there transmitted to the receivers 44.

Figure 6:
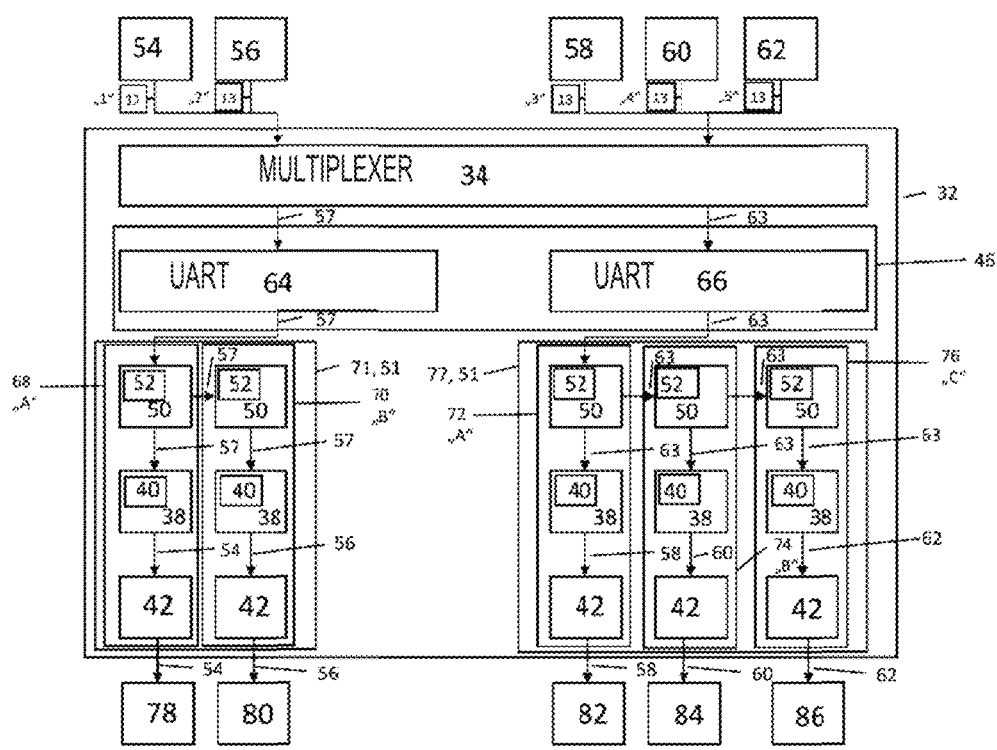
FIG. 6 shows a schematic view of an exemplary embodiment of a data transmission device to transmit data contained in five independent data streams using two UARTs and five mediation devices.

FIG. 6 shows a schematic view of an exemplary embodiment of a data transmission device 32 to transmit data contained in five independent data streams 54, 56, 58, 60, 62 using two UARTs 64, 66 and five mediation devices 68, 70, 72, 74, 76.

In the example of FIG. 6, a first independent data stream 54 and a second independent data stream 56 are transmitted to a multiplexer 34 which attaches specific data stream identifiers 13 to each of the independent data streams 54, 56 and then multiplexes the two independent data streams 54, 56 and their respective specific data stream identifiers 13 into a first multiplexed data stream 57. For example, the multiplexer 34 attaches a first index "I" to the first independent data stream 54 and a second index "2" to the second independent data stream 56.

Similarly, a third independent data stream 58, a fourth independent data stream 60, and a fifth independent data stream 62 are transmitted to the multiplexer 34. Again, the multiplexer attaches specific data stream identifiers 13 to these independent data streams 58, 60, 62. For example, a third "3", fourth "4", and fifth index "5" is attached to the third 58, fourth 60, and fifth independent data stream 62, respectively. Then, the independent data streams 58, 60, 62 and their respective specific data stream identifiers 13 are multiplexed into a second multiplexed data stream 63.

The first multiplexed data stream 57 is transmitted to a first UART 64 of a LVDS serializer 46. Similarly, the second multiplexed data stream 63 is transmitted to a second UART 66 of the LVDS serializer 46.

Next, the first multiplexed data stream 57 is transmitted from the first UART 64 to the deserializer 50 of a first mediation device 68. Then, the first multiplexed data stream 57 is transmitted from the first mediation device 68 to the deserializer 50 of a second mediation device 70. The first 68 and the second mediation devices 70 are wired in sequence 51 and therefore constitute a first daisy chain 71.

In the same way, the second multiplexed data stream 63 is transmitted from the second UART 66 to the deserializer 50 of a third mediation device 72. Then, the second multiplexed data stream 63 is transmitted from the third mediation 72 device to the deserializer 50 of a fourth mediation device 74. Next, the second multiplexed data stream 63 is transmitted from the fourth mediation 74 device to the deserializer 50 of a fifth mediation device 76. The third 72, fourth 74, and fifth mediation devices 76 are wired in sequence 51 and therefore constitute a second daisy chain 77.

In the example of FIG. 6, the deserializer 50 of the first mediation device 68 and the third mediation device 72 is of type A and therefore characterized by a first part number "A" which simultaneously is its specific label 52. For example, the type of a deserializer can be its model type. The deserializer 50 of the second mediation device 70 and the fourth mediation device 74 is of type B and therefore characterized by a specific label 52 corresponding to a second part number "B". The deserializer 50 of the fifth mediation device 76 is of type C and therefore characterized by a specific label 52 corresponding to a third part number "C".

In a next step, each deserializer 50 transmits its received multiplexed data stream 57, 63 to its attached microcontroller 38. Each microcontroller 38 is programmed to have access to the allocation protocol 40 and also to the attached deserializer's 50 specific label 52. In the example of FIG. 6, the allocation protocol 40 is implemented as a look-up-table which selects an independent data stream 54, 56, 58, 60, 62 based on a mapping of the type of the deserializer 50 and the specific data stream identifier 13. In other words, if the microcontroller 38 receives the specific label 52 of the deserializer 50 to be "A", then the independent data stream 54, 58 which has a specific data stream identifier of "1" is selected. Similarly, if the microcontroller receives the specific label 52 of the deserializer 50 to be "B", then the independent data stream 56, 60 which has a specific data stream identifier of "2" is selected. If the microcontroller receives the specific label 52 of the deserializer 50 to be "C", then the independent data stream 62 which has a specific data stream identifier of "3" is selected. This effectively allocates each microcontroller 38 to exactly one independent data stream 54, 56, 58, 60, 62.

In the example of FIG. 6, the microcontroller 38 of the first mediation device 68 is allocated to independent data stream 54. The same holds for the microcontroller 38 of the second mediation device 70 and the second independent data stream 56. The microcontroller 38 of the third mediation device 72 is allocated to independent data stream 58 while that of the fourth mediation device 74 is allocated to the fourth independent data stream 60. Lastly, the microcontroller 38 of the fifth mediation device 76 is allocated to the fifth independent data stream 62.

In a next step, each microcontroller 38 transmits its selected independent data stream 54, 56, 58, 60, 62 to its attached sender 42.

In a last step, each sender 42 transmits the selected independent data stream 54, 56, 58, 60, 62 to one of the five receivers 78, 80, 82, 84, 86. The allocation of the sender 42 can be done in multiple ways, for example by a wired connection. In the example of FIG. 6, the connection is a Bluetooth connection and made by software implementation. In any case, the allocation of the receiver 78, 80, 82, 84, 86 to the sender 42 is fixed during the transmitting of the respective independent data stream 54, 56, 58, 60, 62. Therefore, the first independent data stream 54 is allocated to receiver 78, the second independent data stream 56 is allocated to receiver 80, and so forth.

Figure 7:
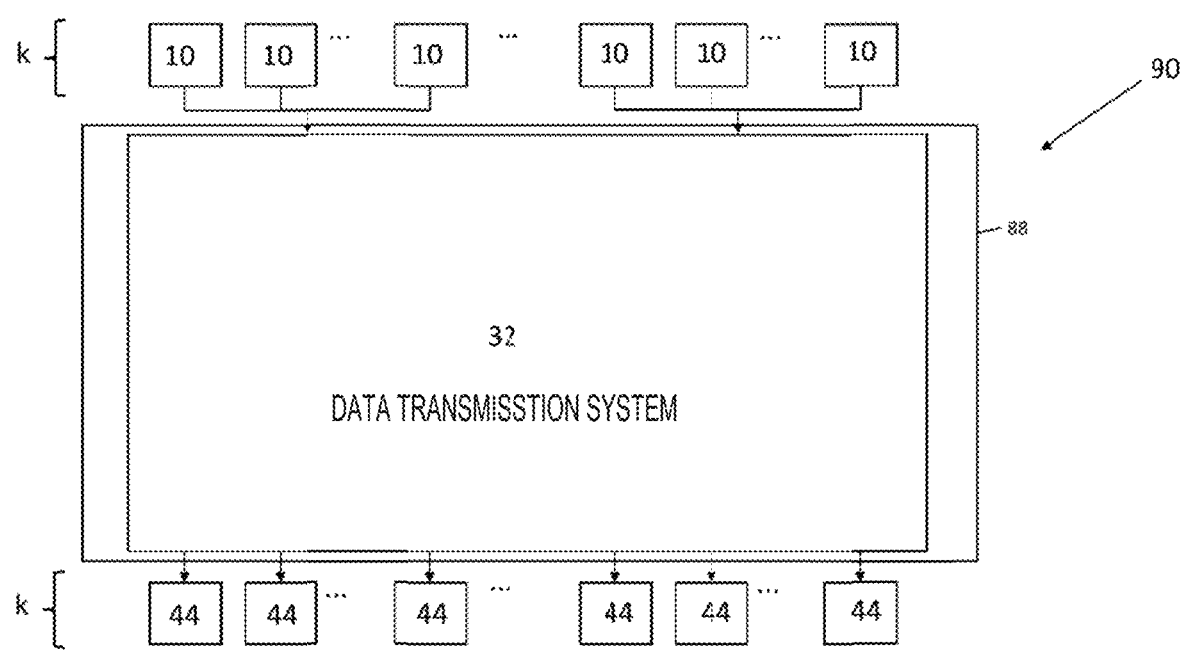
FIG. 7 shows a schematic view of a data transmission system to transmit data contained in a multitude of independent data streams in a vehicle.

FIG. 7 shows a schematic view of a data transmission system 90 to transmit data contained in a multitude of independent data streams 10 in a vehicle 88.

It is worth noting that the data transmission system 32 in FIG. 7 is only outlined. Its working principles are described in FIGS. 3-6 and can be substituted into FIG. 7.

The invention claimed is:

1. A data transmission method to transmit data contained in k independent data streams to k receivers, whereas each of the k independent data streams is to be allocated to one of the k receivers, the method comprising:
providing a data transmission device with a number of i Universal Asynchronous Receiver Transmitters (UARTs), wherein i<k, k is a positive integer and i is a positive integer and with k microcontrollers, the data transmission device being designed to transmit the independent data streams via the UARTs and the microcontrollers to the receivers, whereas each of the k microcontrollers is assigned to exactly one of the k receivers;
multiplexing the k independent data streams into i multiplexed data streams, whereas a specific data stream identifier is allocated to each of the k independent data streams, whereas to generate out of the k independent data streams each $i^{th}$ of the i multiplexed data streams, each $i^{th}$ of the multiplexed data streams comprises at least two of the k independent data streams with their respective specific data stream identifiers;
transmitting the i multiplexed data streams to exactly one of the i UARTs;
transmitting the i multiplexed data streams from the i UARTs to the k microcontrollers, whereas each of the k microcontrollers is assigned to exactly one of the i UARTs, whereas each of the i UARTs is transmitting its $i^{th}$ multiplexed data stream to at least two of the k microcontrollers;
demultiplexing, within each of the k microcontrollers, the received multiplexed data stream, into the at least two independent data streams based on their specific data stream identifiers;
selecting, within each of the k microcontrollers, one of the demultiplexed independent data streams via exactly one allocation protocol which allocates the k independent data streams to exactly one of the k receivers; and
sending the selected of the k independent data streams to the allocated of the k receivers.

2. The data transmission method according to claim 1, wherein the data transmission device is provided as part of a vehicle.

3. The data transmission method according to claim 1, wherein the specific data stream identifier is provided as an index.

4. The data transmission method according claim 1, wherein the data transmission device is provided with k mediation devices, each containing one of the k microcontrollers and one of k deserializers, each of the k deserializers being characterized by a specific label, each deserializer being designated to one microcontroller, whereas each of the k deserializers receives one of the i multiplexed data streams, whereas the deserializers transmit the received multiplexed data streams to their designated microcontroller, whereas the allocation protocol allocates a unique combination of the specific labels of the k deserializers and the specific data stream identifiers of the demultiplexed k independent data streams to the k receivers.

5. The data transmission method according to claim 4, wherein the k mediation devices are arranged into i daisy chains, whereas each daisy chain comprises at least two of the k mediation devices wired in a sequence, whereas the first mediation device of each of the i daisy chains is physically connected to exactly one of the i UARTs, whereas the $i^{th}$ multiplexed data stream is transmitted from the $i^{th}$ UART to the first mediation device of the $i^{th}$ daisy chain, whereas the first mediation device in the $i^{th}$ daisy chain transmits the $i^{th}$ multiplexed data stream to the succeeding mediation device in the sequence of the $i^{th}$ daisy chain.

6. The data transmission method according to claim 5, wherein each mediation device within the sequence of the $i^{th}$ daisy chain transmits the $i^{th}$ multiplexed data stream to the succeeding mediation device in the sequence of the $i^{th}$ daisy chain.

* * * * *